United States Patent
Tripathi et al.

(10) Patent No.: US 7,689,702 B1
(45) Date of Patent: Mar. 30, 2010

(54) METHODS AND APPARATUS FOR COORDINATING PROCESSING OF NETWORK CONNECTIONS BETWEEN TWO NETWORK PROTOCOL STACKS

(75) Inventors: Sunay Tripathi, Santa Clara, CA (US); Erik Nordmark, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1243 days.

(21) Appl. No.: 10/698,212

(22) Filed: Oct. 31, 2003

(51) Int. Cl.
*G06F 15/16* (2006.01)
(52) U.S. Cl. .................. 709/230; 709/250; 370/389
(58) Field of Classification Search ................. 709/238, 709/250; 370/389
See application file for complete search history.

(56) References Cited

U.S. PATENT DOCUMENTS

| | | | |
|---|---|---|---|
| 5,999,526 A * | 12/1999 | Garland et al. | 370/352 |
| 6,393,487 B2 * | 5/2002 | Boucher et al. | 709/238 |
| 6,421,317 B1 * | 7/2002 | Denecheau et al. | 370/222 |
| 6,466,656 B1 * | 10/2002 | Evans et al. | 379/93.07 |
| 6,477,567 B1 * | 11/2002 | Ohara | 709/223 |
| 6,622,172 B1 * | 9/2003 | Tam | 709/232 |
| 6,697,868 B2 * | 2/2004 | Craft et al. | 709/230 |
| 6,904,519 B2 * | 6/2005 | Anand et al. | 713/100 |
| 6,981,140 B1 * | 12/2005 | Choo | 713/164 |
| 7,007,103 B2 * | 2/2006 | Pinkerton et al. | 709/238 |
| 7,054,940 B2 * | 5/2006 | Litwin | 709/227 |
| 7,076,568 B2 * | 7/2006 | Philbrick et al. | 709/250 |
| 7,181,531 B2 * | 2/2007 | Pinkerton et al. | 709/238 |
| 7,181,544 B2 * | 2/2007 | Vangal et al. | 709/250 |
| 7,287,106 B2 * | 10/2007 | Wu | 710/57 |
| 7,313,623 B2 * | 12/2007 | Elzur et al. | 709/227 |
| 2001/0029520 A1 * | 10/2001 | Miyazaki et al. | 709/200 |
| 2002/0062333 A1 * | 5/2002 | Anand et al. | 709/105 |
| 2002/0091844 A1 * | 7/2002 | Craft et al. | 709/230 |
| 2003/0093810 A1 * | 5/2003 | Taniguchi | 725/112 |

(Continued)

OTHER PUBLICATIONS

Constantinos Dovrolis, "Operating System Issues in Network Interfaces," Jan. 2001, http://www.cc.gatech.edu/fac/Constantinos.Dovrolis/oper_sys.html.

(Continued)

*Primary Examiner*—Hassan Phillips
*Assistant Examiner*—Backhean Tiv
(74) *Attorney, Agent, or Firm*—Osha • Liang LLP

(57) ABSTRACT

Methods and apparatus for processing a network connection are disclosed. The network connection is established by a first network protocol stack. A determination is made whether to offload the network connection from the first network protocol stack to the second network protocol stack. The network connection is then transferred from the first network protocol stack to the second network protocol stack when a determination has been made to offload the network connection from the first network protocol stack to the second network protocol stack. The network connection is handled by second network protocol stack until a determination has been made to offload the network connection back to the first network protocol stack. When an indicator is received indicating a request to transfer the network connection back to the first network protocol stack, the network connection is transferred back to the first network protocol stack. State information associated with the network connection is shared by the two network protocol stacks, thereby enabling the network connection to be transferred seamlessly and without loss of data.

30 Claims, 11 Drawing Sheets

U.S. PATENT DOCUMENTS

| | | | |
|---|---|---|---|
| 2003/0145098 A1* | 7/2003 | Litwin | 709/232 |
| 2003/0204634 A1* | 10/2003 | Pinkerton et al. | 709/250 |
| 2004/0015966 A1* | 1/2004 | MacChiano et al. | 718/1 |
| 2004/0044767 A1* | 3/2004 | Rivers et al. | 709/225 |
| 2004/0062245 A1* | 4/2004 | Sharp et al. | 370/392 |
| 2004/0064589 A1* | 4/2004 | Boucher et al. | 709/250 |
| 2004/0103278 A1* | 5/2004 | Abhishek et al. | 713/160 |
| 2004/0114569 A1* | 6/2004 | Naden et al. | 370/351 |
| 2004/0172628 A1* | 9/2004 | Aramaki et al. | 717/176 |
| 2004/0193733 A1* | 9/2004 | Vangal et al. | 709/250 |
| 2004/0196828 A1* | 10/2004 | Wells et al. | 370/352 |
| 2004/0202109 A1* | 10/2004 | Akiyama et al. | 370/235 |
| 2004/0267880 A1* | 12/2004 | Patiejunas | 709/203 |
| 2005/0066060 A1* | 3/2005 | Pinkerton et al. | 709/249 |
| 2005/0073960 A1* | 4/2005 | Oura et al. | 370/252 |
| 2005/0086349 A1* | 4/2005 | Subramaniyan | 709/230 |
| 2005/0135361 A1* | 6/2005 | Lim et al. | 370/389 |
| 2006/0069792 A1* | 3/2006 | Pinkerton et al. | 709/230 |
| 2006/0105781 A1* | 5/2006 | Ueda et al. | 455/456.1 |

OTHER PUBLICATIONS

"Unix Manual Page for in.mpathd," http://www.scit.wlv.ac.uk/cgi-bin/mansec?1M+in.mpathd, downloaded from the Internet on Oct. 5, 2004.

"Docs.sun.com—Sun Product Documentation," http://docs.sun.com/db/doc/816-0211/6m6nc66sm?a=view, downloaded from the Internet on Oct. 5, 2004.

"ISCSI," http://en.wikipedia.org/wiki/ISCSI, downloaded from the Internet on Oct. 5, 2004.

"TCP Offload Engine," http://en/wikipedia.org/wiki/TCP_Offload_Engine, downloaded from the Internet on Oct. 5, 2004.

* cited by examiner

Data Structures

A. Data structures maintained by socket layer:

1. Connection state maintained by socket layer (SONODE): Socket state information.

SOCKET LAYER CONNECTION IDENTIFIER
            HARDWARE CONNECTION IDENTIFIER
            POINTER TO CONNECTION STATE MAINTAINED BY KERNEL (* CONNT)

2. Connection state table maintained by socket layer:

| Identifier | State information |
|---|---|
| A | Pointer to socket layer connection state |
| . | . |
| . | . |

B. Connection state maintained by kernel (CONNT): TCP/IP state information
        KERNEL CONNECTION IDENTIFIER 1. Minimum state necessary to offload a connection (MIN_TCP_T):
        Local (server) and remote (client) IP addresses and ports
        Send/receive sequence numbers of packets for the connection
        Any round trip estimates for each packet
        Congestion window, slow start C. Hardware connection state maintained by NIC (HW_CONN_T): NIC connection state HARDWARE CONNECTION IDENTIFIER (HW_CONNID)
        POINTER TO SOCKET STATE INFORMATION (*SONODE)

1. Minimum state necessary to offload a connection (MIN_TCP_T):
        Local (server) and remote (client) IP addresses and ports
        Send/receive sequence numbers of packets for the connection
        Any round trip estimates for each packet
        Congestion window, slow start

Figure 3

METHODS AND APPARATUS FOR COORDINATING PROCESSING OF NETWORK CONNECTIONS BETWEEN TWO NETWORK PROTOCOL STACKS

RELATED APPLICATIONS

This invention is related to U.S. patent application Ser. No. 10/698,168, filed on the same day as this patent application, naming Tripathi et al. as inventors, and entitled "METHODS AND APPARATUS FOR COORDINATING PROCESSING OF NETWORK CONNECTIONS BETWEEN A SOFTWARE NETWORK PROTOCOL STACK AND A NETWORK INTERFACE CARD." That application is incorporated herein by reference in its entirety and for all purposes.

This invention is also related to U.S. patent application Ser. No. 10/698,688, filed on the same day as this patent application, naming Tripathi et al. as inventors, and entitled "METHODS AND APPARATUS FOR RECOVERING FROM A FAILED NETWORK INTERFACE CARD." That application is incorporated herein by reference in its entirety and for all purposes

BACKGROUND

Each network operating system manufacturer has implemented its own networking protocols to provide the required networking functions. These protocols operate as distinct programs or processes that the network operating system uses to transport data between network nodes. Each set of programs is commonly referred to as a network protocol stack. While the underlying functionality of all network protocol stacks is similar, the implementation often differs. A network protocol stack generally refers to a set of layers (e.g., TCP, IP, etc.) through which all data passes at both client and server ends of a data exchange. One exemplary network protocol stack is the Transmission Control Protocol/Internet Protocol (TCP/IP) network protocol stack.

Processing capabilities of a server are generally limited by the number of central processing units (CPUs) in the server and the capabilities of each of the CPUs. In order to increase the capabilities of a server, it would seem logical to merely increase the number of CPUs in a single server. However, while a single CPU is costly, increasing the number of CPUS generally increases the cost of a server exponentially. Thus, increasing the number of CPUs is generally cost prohibitive.

Generally, the CPU of a server spends a substantial amount of time performing network processing, including processing performed by the network protocol stack. Specifically, a server can spend between 70 and 80 percent of its total CPU resources processing packets. As a result, little CPU resources remain for execution of an application.

One solution that has been implemented by various networking companies has been to introduce a protocol offload capable Network Interface Card (NIC) such as a TCP Offload Engine (TOE) capable NIC (i.e., TCP capable NIC) which can perform all network processing on the network card itself, leaving the CPU free to perform other processing. This has been a viable solution since adding one or more NICs is substantially less costly than increasing the number of CPUs. However, substantial latencies exist in setting up a network connection via a NIC, which can cause overall performance degradation. Moreover, short lived network connections consume valuable resources on the NIC that could be better utilized. In addition, a NIC may be incapable of supporting some network connections that require special processing capabilities. As a result, allowing the NIC to handle all network connections can be counter productive to performance.

In addition, a NIC suffers from periodic hardware failure. As a result, incoming packets handled by a faulty NIC could be erroneously dropped. Similarly, outbound packets handled by a failing NIC could irretrievably be lost.

SUMMARY

Methods and apparatus are disclosed for processing a network connection by coordinating the performance of two different network protocol stacks at a server processing the network connection. Specifically, both of the network protocol stacks may have different processing capabilities. Accordingly, through coordinating the performance of the two network protocol stacks, the performance of the server may be improved.

In accordance with one aspect of the invention, methods and apparatus for processing a network connection include establishing the network connection by a first network protocol stack, determining whether to offload the network connection from the first network protocol stack to the second network protocol stack, and transferring the network connection from the first network protocol stack to the second network protocol stack when a determination has been made to offload the network connection from the first network protocol stack to the second network protocol stack.

In accordance with another aspect of the invention, a network device adapted for processing a network connection includes an operating system having a first network protocol stack and a second network protocol stack coupled to the first network protocol stack. The operating system is configured for determining whether to offload a network connection to the second network protocol stack and transferring the network connection from the first network protocol stack to the second network protocol stack when it determines that it will offload the network connection to the second network protocol stack. In addition, the operating system is configured to process a network connection that has been offloaded back to the first network protocol stack from the second network protocol stack.

In accordance with another aspect of the invention, methods and apparatus for determining whether (and when) to offload a network connection from the first network protocol stack to the second network protocol stack are disclosed. Various conditions may be taken into consideration in order to determine whether (or when) to transfer a particular network connection. For instance, the number of network connections that have already been transferred to the second network protocol stack may be considered. In addition, the capabilities of the second network protocol stack (e.g., options and/or protocols) may be considered. Moreover, the size of the data being transmitted may also be considered. Finally, the network connection may be transferred during a specified time (e.g., when data is being transmitted to the client), in order to prevent any delay as a result of the transfer of the network connection. In this manner, a transfer of a network connection may be made seamlessly.

In accordance with yet another aspect of the invention, methods and apparatus for determining whether (and when) to offload a network connection back to the first network protocol stack from the second network protocol stack are disclosed. For instance, it may be desirable to transfer a network connection back to the first network protocol stack when processing of the network connection is essentially completed. Thus, when the advantages of processing capabilities of the second network protocol stack can no longer be gained, the network connection may be offloaded back to the first network protocol stack. Moreover, if the second network protocol stack is no longer functional (e.g., due to a hardware failure), the network connection may be offloaded back to the first network protocol stack. In addition, the second network protocol stack may refuse the network connection if it is not capable of processing the network connection. Alternatively, the second network protocol stack may decide to accept the network connection, but offload another network connection back to the first network protocol stack in order enable the second network protocol stack to process the transferred network connection.

In accordance with yet another aspect of the invention, state information for the network connection is "shared" by the two network protocol stacks. This may be accomplished through transmitting and/or obtaining state information by one of the network protocol stacks from the other network protocol stack. In addition, any unsent and/or undelivered data is "shared" or accessible by both of the network protocol stacks, thereby enabling any unsent or undelivered data to be processed without loss of data or substantial delay.

In accordance with one embodiment of the invention, the first network protocol stack is a software network protocol stack implemented in the operating system kernel of the server and the second network protocol stack is a hardware network protocol stack implemented in a network interface card (NIC) such as a TOE capable NIC. Communication between the software and hardware network protocol stack is achieved via a driver associated with the NIC. In addition, both of the network protocol stacks are TCP/IP stacks.

In accordance with one embodiment of the invention, loss of data is prevented by maintaining state information for a connection and copies of any unsent and/or undelivered data at the driver associated with the hardware network protocol stack. Any acknowledgements are sent after data has been transmitted, rather than prior to its transmission. In addition, the driver is notified when data has been successfully sent or received by the NIC, thereby enabling the driver to discard any data that is no longer needed.

In accordance with one aspect of the invention, state information associated with the network connection is provided to (or obtained by) the driver associated with the NIC when the network connection is transferred from the software network protocol stack to the hardware network protocol stack. A copy of the state information is maintained by the driver, thereby enabling the software network protocol stack to obtain the state information from the driver in the event of a failure of the network interface card. The state information is provided from the driver to the network interface card, thereby enabling the hardware network protocol stack to process the network connection.

In accordance with another aspect of the invention, state information for the network connection is received by the driver and provided by the driver to the NIC when the network connection has been transferred to the NIC. When a data packet is processed by the NIC, it is processed such that the data packet is received by the NIC and the driver, thereby enabling the software network protocol stack to obtain the state information and the data packet from the driver in the event of a failure of the NIC.

In accordance with another embodiment of the invention, when a connection is transferred from the software network protocol stack to the hardware network protocol stack, the computer operating system initiates the transfer of the connection. Similarly, when a connection is transferred back to the software protocol stack from the hardware network protocol stack, the computer operating system is notified so that it may transfer the network connection back to the software network protocol stack. In addition, any relevant state information, such as TCP/IP connection state information (e.g., IP addresses, ports, send/receive packet sequence numbers) is shared or obtained. The state information and unsent/undelivered packets are maintained by the driver associated with the hardware network protocol stack. Accordingly, in the event of a failure of the NIC, the computer operating system communicates with the driver to ensure that the transfer of the network connection between the two network protocol stacks is seamless and without loss of data.

The embodiments of the invention may be implemented software, hardware, or a combination of hardware and software. The invention can also be embodied as computer readable code on a computer readable medium. In addition, data structures disclosed are also part of embodiments of the invention.

BRIEF DESCRIPTION OF THE DRAWINGS

Embodiments of the invention may best be understood by reference to the following description taken in conjunction with the accompanying drawings in which:

FIG. 3 is a diagram illustrating exemplary data structures that may be maintained and transmitted by the socket layer, the kernel, and the TOE capable NIC in accordance with one embodiment of the invention.

DETAILED DESCRIPTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

In accordance with one aspect of the invention, a computer architecture is disclosed which supports coordination between two network protocol stacks. In accordance with one embodiment, a software network protocol stack coordinates its performance with a hardware network protocol stack implemented in a NIC capable of performing network processing (e.g., TCP processing) such as a TCP Offload Engine capable NIC (TOE capable NIC), thereby achieving increased performance of the computer system and better utilization of resources. In this manner, a network connection is efficiently and reliably handled.

Figure 1:
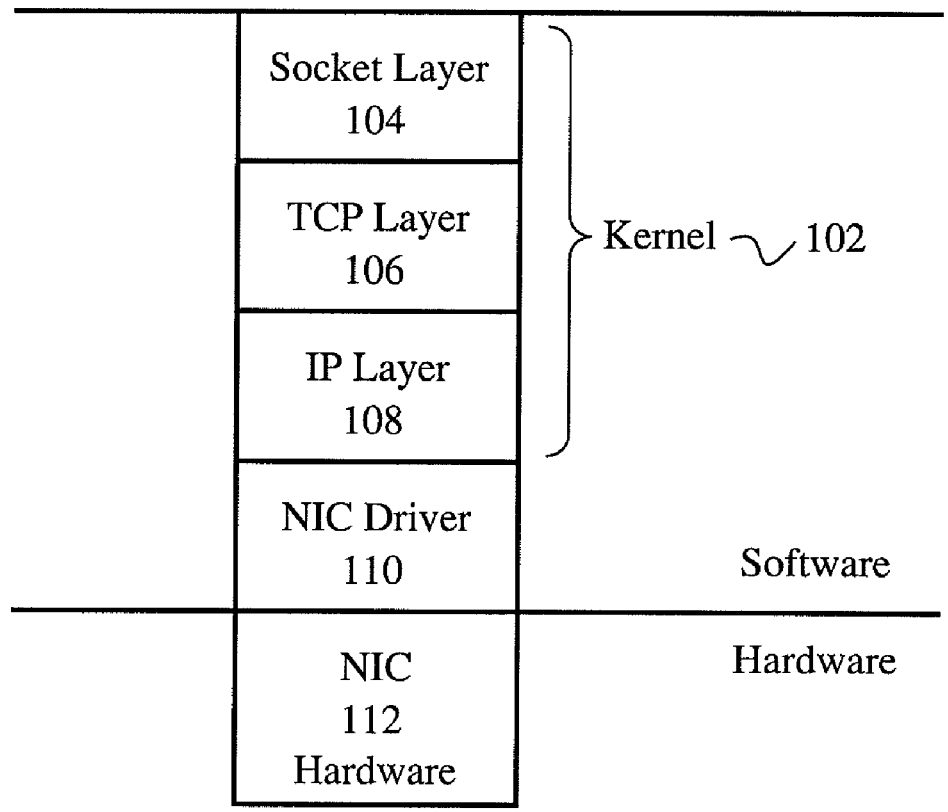
FIG. 1 is a block diagram illustrating a computer system including a prior art Network Interface Card (NIC).

Generally, a network protocol stack is implemented in software. As shown in FIG. 1, an exemplary operating system includes a kernel 102. The kernel is the core of the computer operating system. The kernel's services may be requested by other parts of the operating system or by an application 103 through a system call routine.

At the top of the network protocol stack, applications 103 are generally written to function through the use of a specific network protocol. The application developer then needs to write a different version of the application for it to operate using different network protocols. Many developers have overcome these issues by writing applications based upon a common or standard interface, such as NetBIOS, WinSock, or BSD sockets. Generally, these interfaces communicate directly with the socket layer 104 of the kernel. The socket layer was designed to provide independence from the network communication layer and interfaces with system call routines that interface to the kernel 102.

The kernel 102 includes the socket layer 104, a TCP layer 106, and an IP layer 108. Specifically, the TCP layer 106 is capable of performing a TCP three way handshake to establish a TCP connection, and manages the assembling of a message or file into packets that may be transmitted over the Internet during the TCP connection. The IP layer 108 handles the addressing for each packet. In addition, a Network Interface Card (NIC) Driver 110 capable of communicating with a NIC 112 is in communication with the kernel 102 via a standard interface such as a Data Link Provider Interface. In this manner, a software network protocol stack may be implemented.

As described above, the CPU of a server spends a substantial amount of time performing network processing (e.g., TCP processing). As a result, little CPU resources remain for execution of an application. Moreover, increasing the number of CPUs is typically cost-prohibitive.

One solution that has been implemented by various networking companies has been to introduce a TCP Offload Engine (TOE) capable NIC (i.e., TCP capable NIC) which can perform all TCP processing on the network card itself, leaving the CPU free to perform other processing. This has been a viable solution since adding one or more TOE capable NICs is substantially less costly than increasing the number of CPUs. However, substantial latencies exist in setting up a TCP connection via a TOE capable NIC, which can cause overall performance degradation. Moreover, short lived TCP connections consume valuable resources on the TOE capable NIC that could be better utilized. In addition, a NIC may be incapable of supporting some network connections that require special processing capabilities. As a result, allowing the TOE capable NIC to handle all network connections can be counter productive to performance.

In addition, a NIC such as a TOE capable NIC suffers from periodic hardware failure. As a result, incoming packets handled by a faulty NIC could be erroneously dropped. Similarly, outbound packets handled by a failing NIC could irretrievably be lost.

In accordance with one embodiment of the invention, the coordination between a software network protocol stack and a TOE capable NIC is accomplished. Moreover, the coordination is achieved while maintaining the reliability of data transmission.

Figure 2:
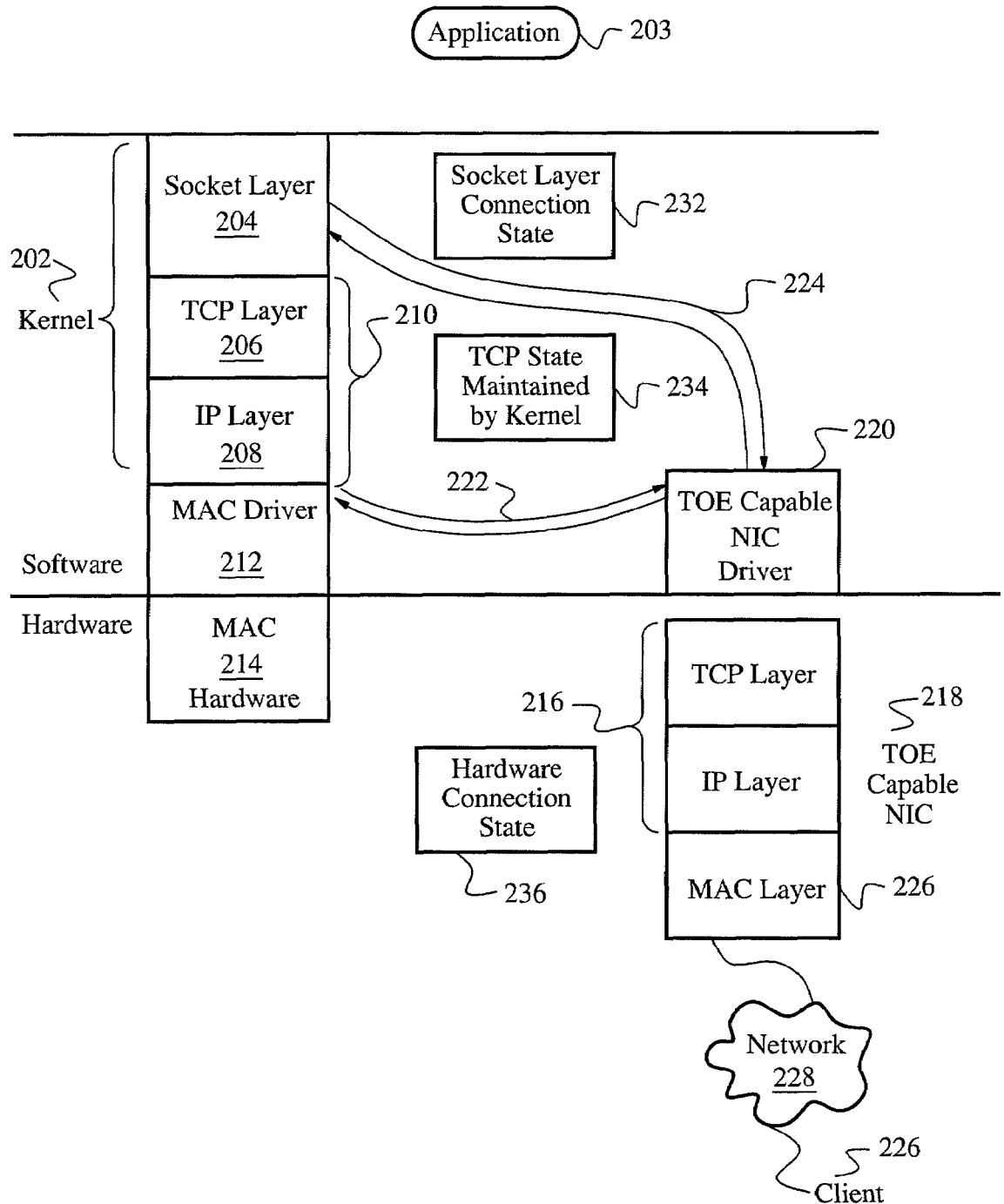
FIG. 2 is a block diagram illustrating an exemplary system including a TCP Offload Engine (TOE) capable NIC in which embodiments of the present invention may be implemented.

FIG. 2 is a block diagram illustrating an exemplary system including a TCP Offload Engine (TOE) capable NIC in which embodiments of the present invention may be implemented. The operating system kernel 202 is the core of the computer operating system. The services of the kernel may be requested by other parts of the operating system or by an application 203 through a system call routine. The kernel 202 includes a socket layer 204, a TCP layer 206, and an IP layer 208. The socket layer 204 interfaces with system call routines that interface to the kernel 202. The TCP layer 206 and the IP layer 208 will be referred to herein as a TCP/IP stack, or a software network protocol stack 210.

Generally, the software network protocol stack 210 receives and transmits packets via a Media Access Controller (MAC) driver 212 and associated MAC 214. Thus, the software network protocol stack 210 may decide to process a particular network connection entirely in software. However, the software network protocol stack 210 may determine, for a variety of reasons, that a network connection will benefit from the processing capabilities of a second network protocol stack (e.g., a hardware network protocol stack). Each of the two network protocol stacks may be implemented in software, hardware, or a combination of hardware and software.

As will be described in further detail below, the software network protocol stack 210 has the option of transferring a network connection to a second network protocol stack. Similarly, once a network connection has been transferred from the software network protocol stack 210 to the second network protocol stack, the network connection may be transferred back to the software network protocol stack 210. In this example, the second network protocol stack is a hardware network protocol stack 216. Specifically, the hardware network protocol stack 216 is implemented in a TOE capable NIC 218.

In order to coordinate the transfer of a network connection between two different network protocol stacks, state information for the network connection is provided, shared, exchanged or accessible by the network protocol stacks. This communication may be accomplished directly. However, when the first network protocol stack is implemented in software and the second network protocol stack is implemented in hardware, a software driver can be used to simplify the communication between the two network protocol stacks. Thus, in accordance with one embodiment, a TOE capable NIC software driver 220 in communication with the TOE capable NIC 218 communicates directly with the kernel 202 as shown at 222. In this manner, the software network protocol stack may coordinate the processing of a particular network connection with the second hardware network protocol stack.

Upon transferring a network connection to the hardware and associated hardware network protocol stack 216, the TOE capable NIC 218 can send packets to the socket layer 204 and receive packets from the socket layer 204 via the TOE capable NIC driver 220, as shown at 224. Packets that are transmitted to a client via the TOE capable NIC are transmitted via MAC layer 226 over network (e.g., Internet) 228 to client 230.

In order to enable a network connection to be transferred between two different network protocol stacks, state information associated with the network connection is stored for use by each of the network protocol stacks. In accordance with one embodiment, the software maintains connection state information and the hardware (e.g., TOE capable NIC) maintains network connection state information. Specifically, the socket layer maintains socket layer connection state information 232 and the kernel maintains TCP/IP state information 234 for the connection. Hardware connection state information 236 is maintained by the hardware (e.g., TOE capable NIC).

Various data structures may be used to maintain and/or communicate connection state information to support two different network protocol stacks. FIG. 3 is a diagram illustrating exemplary data structures that may be maintained by the socket layer, the kernel, and the TOE capable NIC in accordance with one embodiment of the invention. Access to these data structures may be provided among the software layers and between the two different network protocol stacks, for example, by passing a data structure or a pointer the data structure as a parameter to a particular function or procedure. As shown, the socket layer maintains connection state information, which includes a socket layer connection identifier. The socket layer identifier for each connection is maintained in a connection state table maintained by the socket layer, which may be associated with the socket layer connection state information (e.g., via a pointer), as shown. The socket layer connection identifier is also associated with, or mapped to, a hardware connection identifier. In addition, TCP/IP connection state information maintained by the kernel is linked to the socket layer connection identifier. In this example, a pointer to the connection state information maintained by the kernel is maintained in the socket layer data structure. Thus, the socket layer has access to the software connection state information maintained by the socket layer and the kernel. In addition, the socket layer can identify and/or access the relevant connection state information maintained by the hardware.

The kernel maintains a kernel connection identifier that identifies TCP/IP connection state information maintained by the kernel, which may be the same as the socket layer connection identifier. TCP/IP connection state information maintained by the kernel includes local and remote IP addresses and ports identifying the two endpoints (i.e., client and server) for the network connection between a client and the server. In addition, the TCP/IP connection state information includes send and/or receive sequence numbers of one or more packets that have been transmitted and/or received by the server. Additional information such as round trip estimates for each packet, as well as congestion window and slow start information may also be included in the TCP/IP state information maintained by the kernel. Thus, the TCP/IP connection state information may be referred to as the minimum TCP/IP state information necessary to offload the network connection to another TCP/IP stack.

Connection state information maintained by the NIC includes a hardware connection identifier. In addition, the hardware connection identifier is associated with, or mapped to, the socket layer connection state information and the kernel TCP/IP connection state information. In this example, a pointer to the socket state information maintained by the socket layer and a copy of the TCP/IP connection state information maintained by the kernel is passed to the NIC via the NIC driver. Thus, the hardware can identify and/or has access to the relevant state information maintained by the software.

While the above-described data structures may be used to maintain connection state information for a first network protocol stack (e.g., software network protocol stack) and a second network protocol stack (e.g., hardware network protocol stack), these data structures are merely illustrative. Thus, the information may be maintained in an alternate manner, as well as using alternate data structures.

When a network connection is transferred to a network protocol stack for processing of the network connection, the network protocol stack needs current state information for the network connection in order to resume processing where the transferring network protocol stack has stopped processing the network connection. Thus, state information either needs to be transmitted and/or obtained for use by the network protocol stack that is to handle the network connection. In accordance with one embodiment, application programming interfaces are implemented in the driver of the NIC.

In accordance with one embodiment, a first application programming interface (API) is used to initiate the transfer of the network connection to the NIC. The socket layer calls the first application programming interface to initiate the transfer of the network connection to the NIC and the hardware network protocol stack. Specifically, a pointer to the socket connection state information and a pointer to the TCP/IP connection state information maintained by the kernel (e.g., minimum connection state information necessary to offload a network connection) are passed as parameters to the first API. In this manner, software connection state information associated with the first network protocol stack is provided for use by the NIC and its associated hardware network protocol stack. In addition, the hardware connection identifier corresponding to the hardware connection state for the particular network connection is returned to the socket layer via the first application programming interface. In this manner, hardware connection state information is mapped to the software connection state information. Specifically, through the use of the first API, the socket layer may receive the hardware connection identifier for inbound data that has been received by the NIC and the NIC may receive the socket layer connection identifier for outbound data delivered directly to the socket layer.

In addition, a second API is used to obtain network connection state information from the NIC. The TCP layer calls the second application programming interface to obtain the network connection state information from the NIC. Specifically, the hardware connection identifier is passed as a parameter to the second API. Through the use of this API, the TCP layer obtains a pointer to any unsent data that still needs to be sent, and a pointer to any undelivered data that was received by the NIC and acknowledged, but not yet pushed to the socket layer. In addition, the TCP/IP state information (e.g., minimum connection state information necessary to offload a network connection) is returned to the TCP layer via the second API.

As described above, in accordance with one aspect of the invention, a network connection may be transferred between two different network protocol stacks. In accordance with one embodiment, one network protocol stack is implemented within the operating system, and is therefore implemented in software, while the other network protocol stack is implemented in hardware. The hardware may be a network interface card, or more specifically, a TOE capable NIC.

Figure 4:
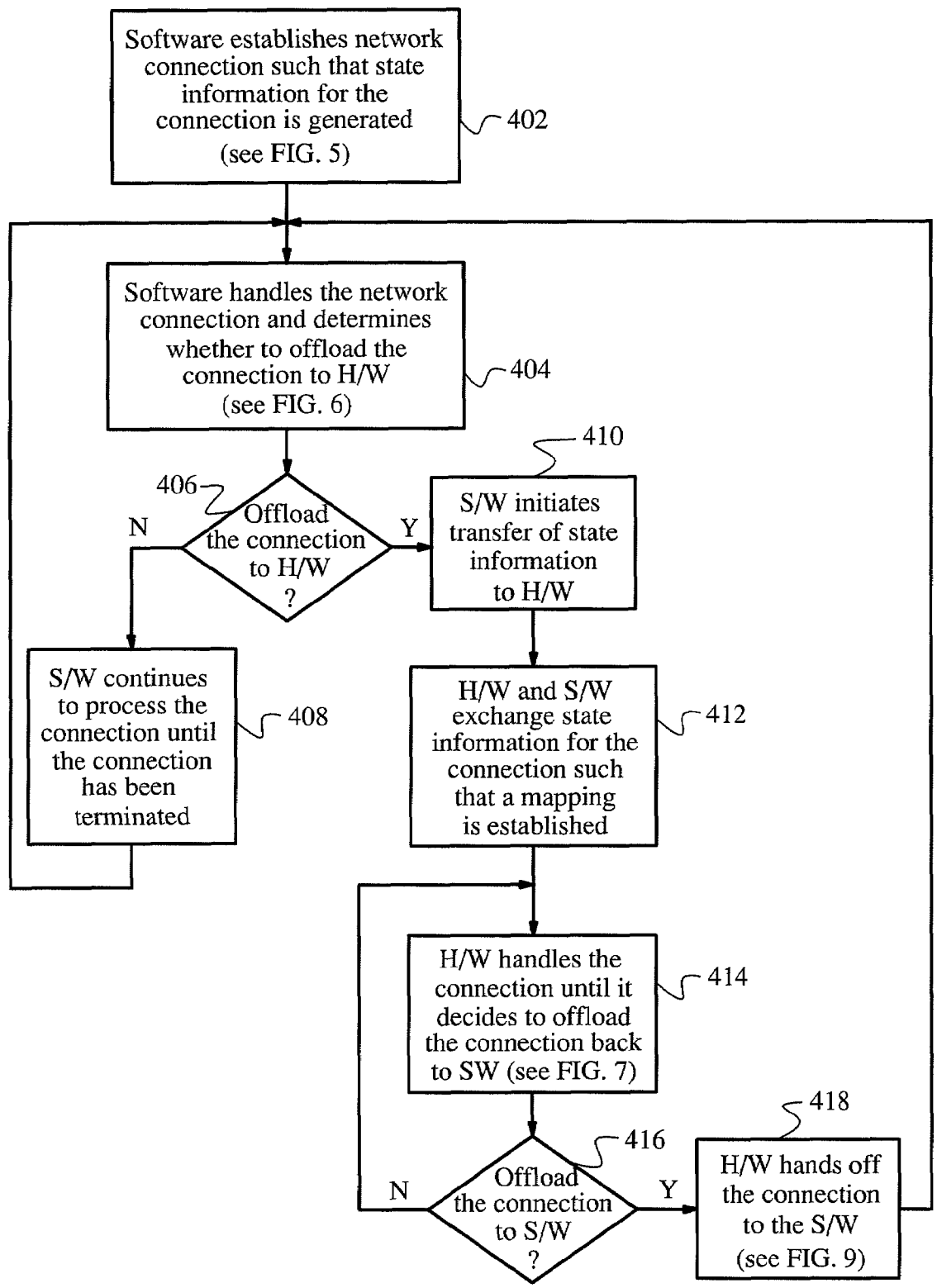
FIG. 4 is a process flow diagram illustrating a method of coordinating between a software network protocol stack and a TOE capable NIC including a hardware network protocol stack in accordance with one embodiment of the invention.

FIG. 4 is a process flow diagram illustrating a method of coordinating between a software network protocol stack and a TOE capable NIC including a hardware network protocol stack in accordance with one embodiment of the invention. As shown at block 402, the operating system software (e.g., operating system kernel) establishes the network connection. Specifically, when the network connection is established, state information for the connection such as that described above with reference to FIG. 3 is generated. As described above, state information may include one or more connection identifiers, as well as additional information for the connection. One method of establishing a network connection will be described in further detail below with reference to FIG. 5.

The software (e.g., operating system) handles the network connection and determines whether to offload the network connection from the first network protocol stack (e.g., software network protocol stack) to a second network protocol stack (e.g., hardware network protocol stack) at block 404. More specifically, the computer operating system determines whether to transfer the network connection from the operating system to a network interface card such as a TOE capable NIC. For instance, the operating system kernel (e.g., socket layer or software network protocol stack) may determine whether to transfer the network connection. One method of handling the network connection by the software will be described in further detail below with reference to FIG. 6. A method of determining whether the network connection is suitable for offloading will be described in further detail below with reference to FIG. 8.

If the software (e.g., operating system) determines not to offload the network connection to hardware at block 406, the software (e.g., computer operating system and any applications) continues to process the network connection until the network connection has been terminated as shown at block 408. The software continues to process the network connection as shown at block 404. It is important to note that the operating system may decide to offload the connection to hardware at any point during the lifetime of the network connection.

If the software (e.g., operating system) determines to offload the network connection from the first network protocol stack (e.g., software network protocol stack) to the second network protocol stack (e.g., hardware network protocol stack) at block 406, the network connection is transferred. In this example, the network connection is transferred from the operating system to the network interface card.

The software (e.g., computer operating system) then initiates a transfer of state connection information to the hardware at block 410. In accordance with one embodiment, the kernel of the operating system initiates the transfer of the state connection information. For example, the transfer of the state connection information may be initiated by the socket layer or the first network protocol stack. In accordance with one embodiment, the socket layer calls the first API as described above to initiate the transfer of the network connection to the network interface card.

The state information associated with the first network protocol stack is then provided for use by the second network protocol stack, thereby enabling the second network protocol stack to resume processing the network connection where the first network protocol stack stopped processing the network connection. In addition, the state information maintained by the software in association with the first network protocol stack is mapped to the state information maintained by the hardware in association with the second network protocol stack, thereby enabling the network connection to be transferred back to the first network protocol stack. Thus the mapping between the network connection state for the first network stack and the network connection state for the second network stack is established such that both of the network protocol stacks can identify each other's state information for a given connection. In accordance with one embodiment, the two different network protocol stacks "exchange" state information for the network connection such that a mapping is established at block 412. As described above, this exchange of state information may merely include the exchanging or mapping of connection identifiers maintained by or associated with each of the network protocol stacks. In addition, other information, such as the TCP/IP state information (e.g., minimum TCP state information necessary to offload a network connection) may be exchanged by the hardware (e.g., NIC) and the software (e.g., operating system). Moreover, this exchange may be performed directly by the two network protocol stacks, or indirectly via the first API call as set forth above.

The second network protocol stack (e.g., hardware network protocol stack) then handles the network connection until a determination has been made to offload the connection back to the first network protocol stack at block 414. In accordance with one embodiment, the hardware (e.g., NIC) handles the network connection until it decides to offload the network connection back to the software. One method of handling the network connection by a NIC will be described in further detail below with reference to FIG. 7. This determination may be made either by the hardware (e.g., NIC) or a driver (e.g., NIC driver) associated with the hardware. For example, the second network protocol stack (e.g., hardware network protocol stack) or its associated driver may decide to offload the network connection back to the first network protocol stack. When such a determination has been made, the second network protocol stack or a driver associated therewith may send an indicator requesting a transfer of the network connection back to the first network protocol stack. In this manner, the hardware (e.g., NIC) may request a transfer of the network connection back to the software (e.g., computer operating system).

When the determination has been made to offload or transfer the network connection back to the first network protocol stack, the network connection is handed off. Specifically, when a determination has been made to offload the network connection back to the software network protocol stack at block 416, the software (e.g., operating system) operates to transfer the network connection back to the software network protocol stack at block 418. Specifically, state information for the network connection is obtained from the second network protocol stack (or associated driver). The software then continues to handle the network connection as shown at block 404 using the obtained state information. One method of performing processing in the NIC to effect the transfer of the network connection back to the software network protocol stack will be described in further detail below with reference to FIG. 9.

Figure 5:
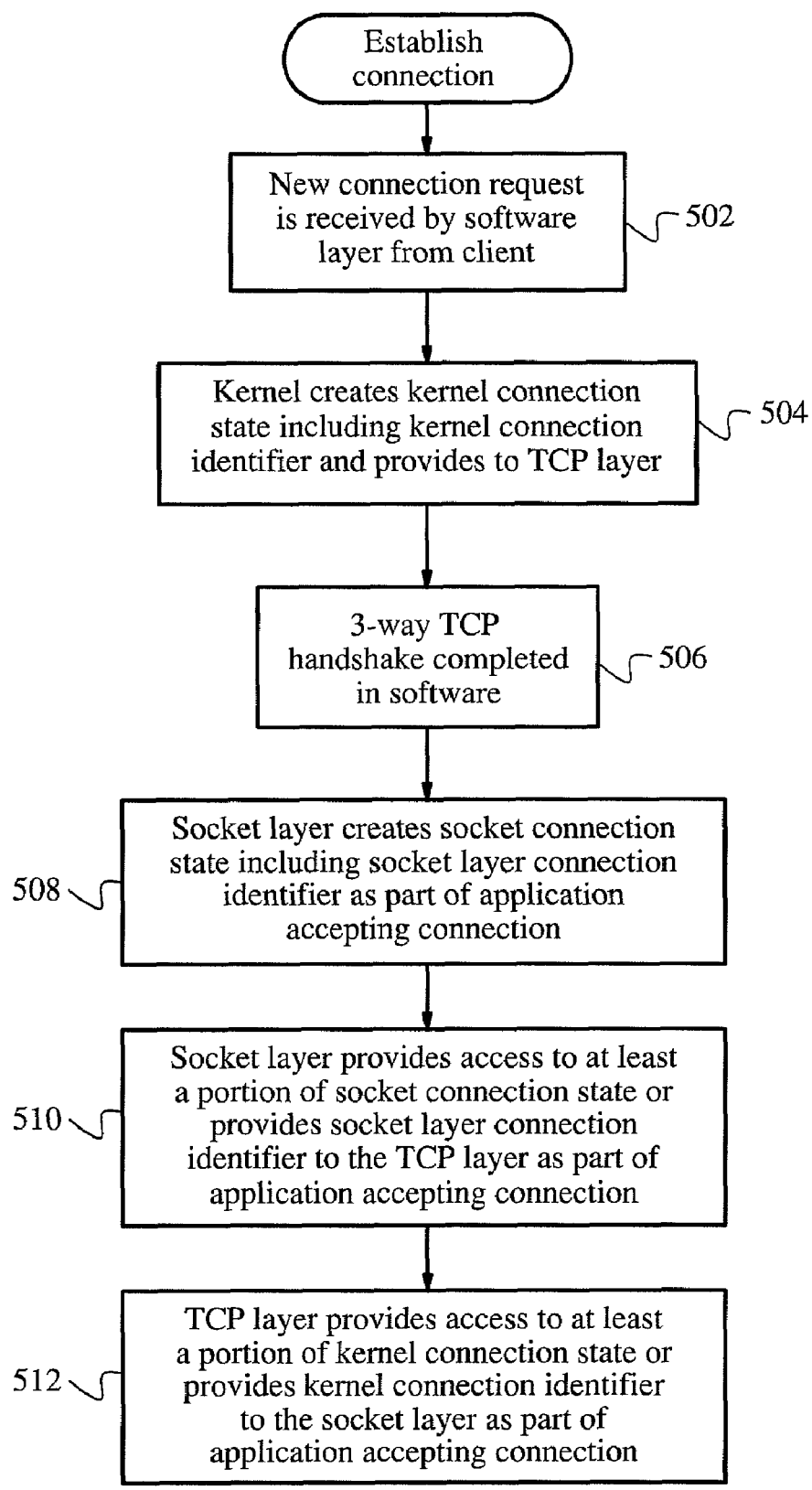
FIG. 5 is a process flow diagram illustrating a method of establishing a network connection as shown at block 402 of FIG. 4 in accordance with one embodiment of the invention.

FIG. 5 is a process flow diagram illustrating a method of establishing a network connection as shown at block 402 of FIG. 4 in accordance with one embodiment of the invention. Generally, a client accesses a server via a network by establishing a network connection (e.g., TCP connection). In order to establish the TCP connection, the client contacts the server. Specifically, when a new connection request is received by the software (e.g., computer operating system) from a client at block 502, the operating system's TCP layer creates TCP/IP connection state information such as that described above with reference to FIG. 3 at block 504. Specifically, the connection state information may include a TCP connection identifier (i.e., kernel connection identifier referred to in FIG. 3) (which other entities like the second network protocol stack can use to identify the TCP connection state of the operating system's TCP layer) and TCP/IP state information (e.g., minimum TCP state information necessary to offload a network connection). In this manner, the first network protocol stack (e.g., software network protocol stack) establishes the network connection. The three-way TCP handshake is then completed in software at block 506 in order to establish the TCP connection. More specifically, TCP processing is generally accomplished in a TCP layer of a network protocol stack implemented at both the client and the server. The socket layer then creates socket connection state information such as that described above with reference to FIG. 3 as a part of the application accepting the network connection at block 508. The socket layer then provides access to at least a portion of the socket connection state information or provides the socket layer connection identifier to the TCP layer as a part of the application accepting the network connection at block 510. The TCP layer provides access to at least a portion of the TCP/IP connection state information (e.g., TCP/IP state information) or provides the TCP connection identifier (i.e., kernel connection identifier) to the socket layer as part of the application accepting the connection at block 512. In this manner, software connection state information is generated.

Figure 6:
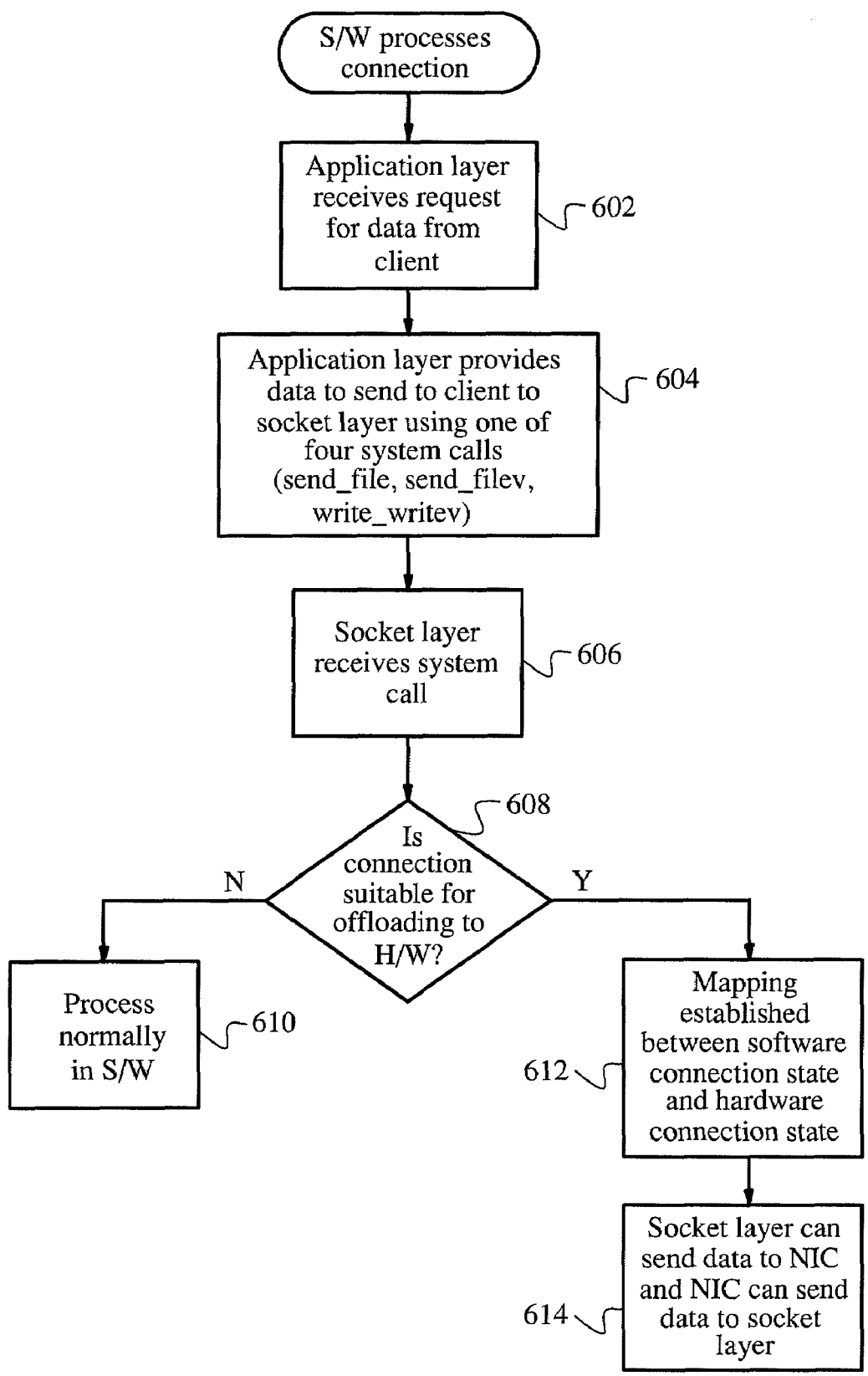
FIG. 6 is a process flow diagram illustrating a method of handling the network connection in software until the software determines to offload the network connection to hardware as shown at block 404 of FIG. 4 in accordance with one embodiment of the invention.

FIG. 6 is a process flow diagram illustrating a method of handling the network connection in software until the software determines to offload the network connection to hardware as shown at block 404 of FIG. 4 in accordance with one embodiment of the invention. When an application layer receives a request for data from a client as shown at block 602, the application layer provides the data to send to the client to the socket layer at block 604 via one of four system calls, sendfile, sendfilev, write, and writev. When the socket layer receives the system call at block 606, it decides whether to offload the network connection to another network protocol stack as shown at block 608. Specifically, the socket layer determines whether the network connection is suitable for offloading to hardware (e.g., NIC). If the socket layer decides that the network connection is not suitable for offloading to hardware, the software continues to process the network connection at block 610.

If the socket layer determines that the connection is suitable for offloading to hardware, it informs the hardware to create the hardware connection state for the connection and a mapping is established between the software connection state and the hardware connection state at block 612. Specifically, as described above, the first API may be called in order to initiate the exchange of the state information. Once the mapping has been established, the socket layer can send data to the NIC and the NIC can send data to the socket layer, as shown at block 614. Specifically, this transmission of data between the socket layer and the NIC is accomplished via the NIC driver.

In accordance with one embodiment, two different procedures are available to send data to the NIC or receive data (send data to the socket layer) as described above with reference to block 614. Specifically, for incoming data, a first receive_data procedure is called by the TOE capable NIC when it wants to deliver inbound data to the socket. The NIC calls receive_data, passing a pointer (or identifier) to the socket state information and a pointer to the data. The socket associates the data with a connection based on the pointer (or identifier) to socket state information passed. For outgoing data, a send_data procedure is called by the socket layer when it wants to send data to the NIC. Specifically, the socket layer calls the send_data procedure along with a pointer (or identifier) to the hardware state information and a pointer to the data, thereby enabling the socket layer to send the data.

Figure 7:
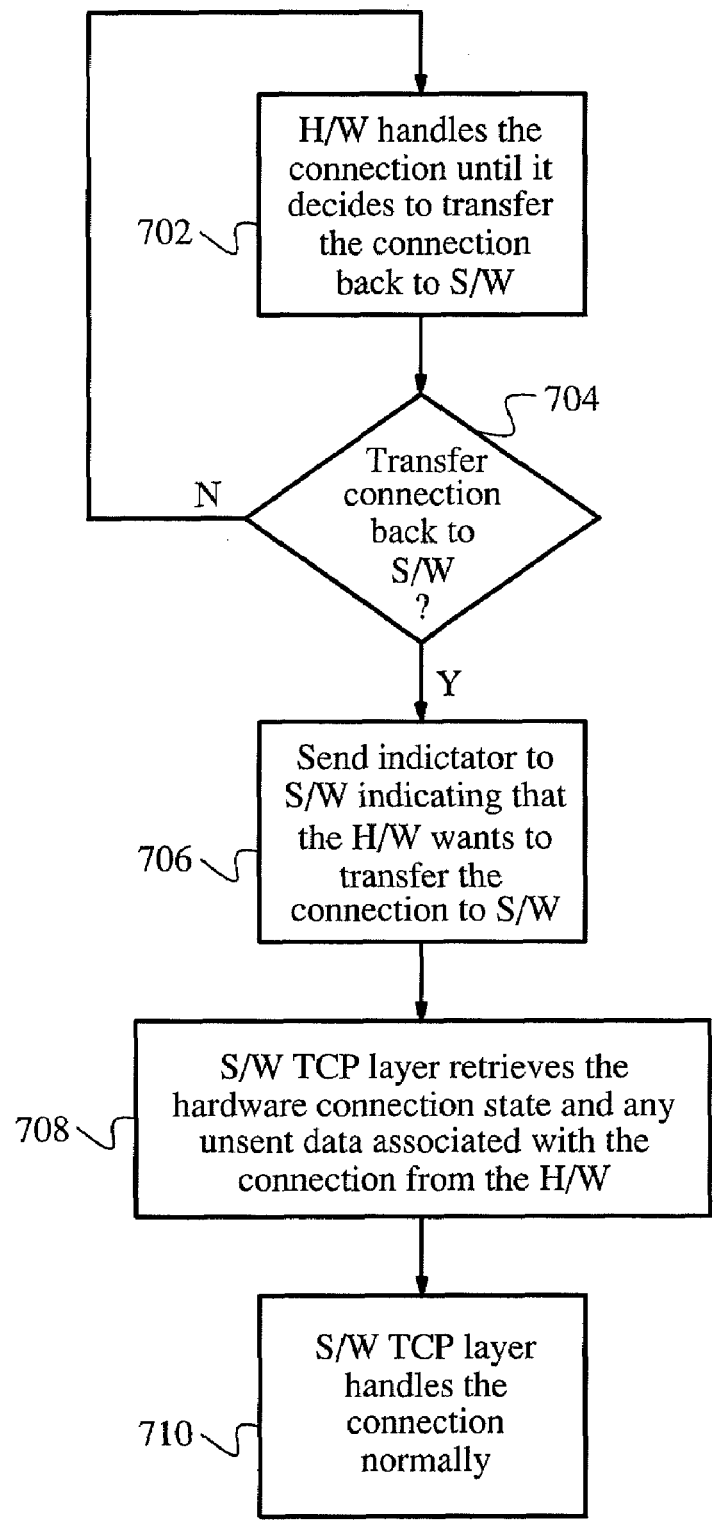
FIG. 7 is a process flow diagram illustrating a method of handling the network connection in hardware until the hardware determines to offload the network connection back to the software as shown at block 414 of FIG. 4 in accordance with one embodiment of the invention.

FIG. 7 is a process flow diagram illustrating a method of handling the network connection in hardware until the hardware determines to offload the network connection back to the software as shown at block 414 of FIG. 4 in accordance with one embodiment of the invention. As described above, once the network connection has been transferred to the NIC, data may be transmitted between the socket layer and the NIC. The hardware continues to handle the network connection until the network interface card (e.g., hardware network protocol.stack) or the driver associated with the network interface card decide to transfer the network connection back to the software network protocol stack at block 702. The decision to transfer the network connection back to the software network protocol stack may be made at any point in time as shown at block 704.

If the NIC or associated driver decides to offload the network connection back to the software and the associated software network protocol stack, an indicator is sent either by the NIC or the NIC driver to the software (e.g., computer operating system) indicating a request to transfer the network connection back to the software network protocol stack at block 706. The software network protocol stack then retrieves the state information associated with the hardware network protocol stack and any unsent and/or unreceived data associated with the connection from the NIC (e.g., hardware network protocol stack) or associated driver as shown at block 708. Specifically, the software network protocol stack (e.g., TCP layer) retrieves this information using the second API as described above with reference to FIG. 3, thereby enabling the software network protocol stack to process the unsent and/or undelivered data. The software TCP layer then handles the network connection normally as shown at block 710.

Figure 8:
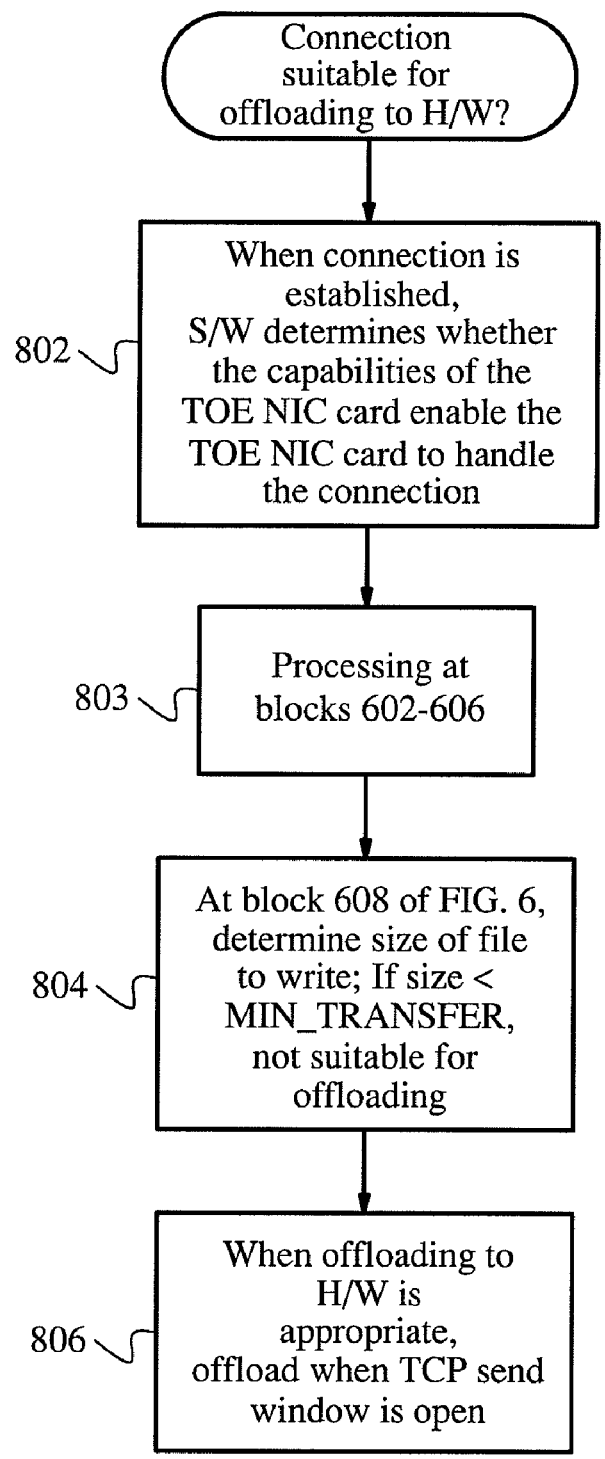
FIG. 8 is a process flow diagram illustrating a method of determining when to offload the network connection from software to hardware as shown at block 406 of FIG. 4 in accordance with one embodiment of the invention.

FIG. 8 is a process flow diagram illustrating a method of determining when (or whether) to offload the network connection from software to hardware as shown at block 406 of FIG. 4 or block 608 of FIG. 6 in accordance with one embodiment of the invention. As described above, this determination may be made by the operating system (e.g., operating system kernel). Specifically, the socket layer and/or first network protocol stack may determine when (or whether) it is appropriate to offload a network connection to a second network protocol stack.

For instance, the network connection may benefit from offloading the network connection for a variety of reasons. When a network connection is established by the software at block 802, the software determines whether the capabilities of the TOE capable NIC enable it and its hardware network protocol stack to handle the connection. For instance, the TOE capable NIC may not support one or more options required by the network connection or may not support a protocol required by the network connection.

Once the software has determined that the TOE capable NIC can support the network connection, it continues to process the network connection as described above with reference to blocks 602-606 of FIG. 6 as shown at block 803 until it determines that the network connection will benefit from offloading the connection to hardware. Various conditions may make it desirable to offload the network connection to hardware. Since a network connection takes longer to establish in hardware than in software, in accordance with one embodiment, it is desirable to establish the hardware connection for data transfers of a significant size. For instance, when a request for data is received from a client, data is obtained from an application layer. Thus, when the socket layer receives the system call to send the data to the client as described above with reference to block 606 of FIG. 6, the socket layer determines the size of the data being transmitted as shown at block 804. If the size of the data (e.g., file) is less than a predefined minimum transfer size, the network connection is not suitable for offloading. However, if the size of the data (e.g., file) exceeds the predefined minimum transfer size, the socket layer decides to offload the network connection from the software network protocol stack to the hardware network protocol stack.

As described above with reference to block 612 of FIG. 6, a mapping is established between the software connection state (kernel state information and socket state information) and the hardware connection state in order to establish the hardware connection. Since hardware connections take a significant amount of time to establish, it is desirable to perform this mapping during a period of time when the delay will be least likely to impact the network connection and therefore least likely to be noticeable to the client. Thus, as shown at block 806, when the software has decided that offloading the network connection to the hardware is appropriate, it sends as many packets as allowed by slow start or TCP send window before transferring the network connection and associated connection state information so that the network connection does not suffer from latency from the transfer of the network connection from software to hardware.

In order to determine whether to offload a network connection, the software is aware that the NIC is TOE capable. In addition, the software can be configured with the capabilities of the TOE capable NIC. For instance, the software may be aware of the number of connections that the TOE capable NIC is capable of processing. Thus, the software (e.g., operating system kernel) may keep track of the number of network connections that have been transferred to the TOE capable NIC and its associated hardware network protocol stack. The software may therefore choose to transfer a network connection to the hardware network protocol stack when the number of network connections being handled by the hardware network protocol stack do not exceed a predefined number of connections. However, in some instances, the number of network connections being handled by the NIC may only slightly exceed the predefined number of connections that the NIC is capable of handling. In accordance with one embodiment, the software (e.g., operating system kernel) may choose to transfer the network connection to the NIC, even when the number of network connections being handled by the NIC exceed the predefined number of connections that the NIC is capable of handling.

In accordance with one embodiment, when a network connection has been transferred to the second network protocol stack, the transfer may be refused or accepted. Specifically, the transfer of the network connection from the software network protocol stack to the hardware network protocol stack may be refused (e.g., when the number of network connections that have been transferred to the hardware network protocol stack exceeds a predefined number of connections). In its determination of whether to accept the network connection, the nature of the network connection may be considered. Thus, even if the number of network connections exceeds the approximate capability of the NIC, the NIC may choose to accept the connection. For instance, the network connection being transferred may require significant resources (e.g., the network connection may require the transfer of a large file). Therefore, in order to accept this particular network connection that will benefit from the processing capabilities of the NIC, the NIC may choose to offload another network connection back to the software network protocol stack. For instance, a network connection not requiring significant resources (e.g., a network connection in a time wait state) may be offloaded back to the software. In this manner, the NIC may control the network connections that are accepted, particularly in instances when the NIC is handling a number of network connections that meet or exceed its capabilities.

Figure 9:
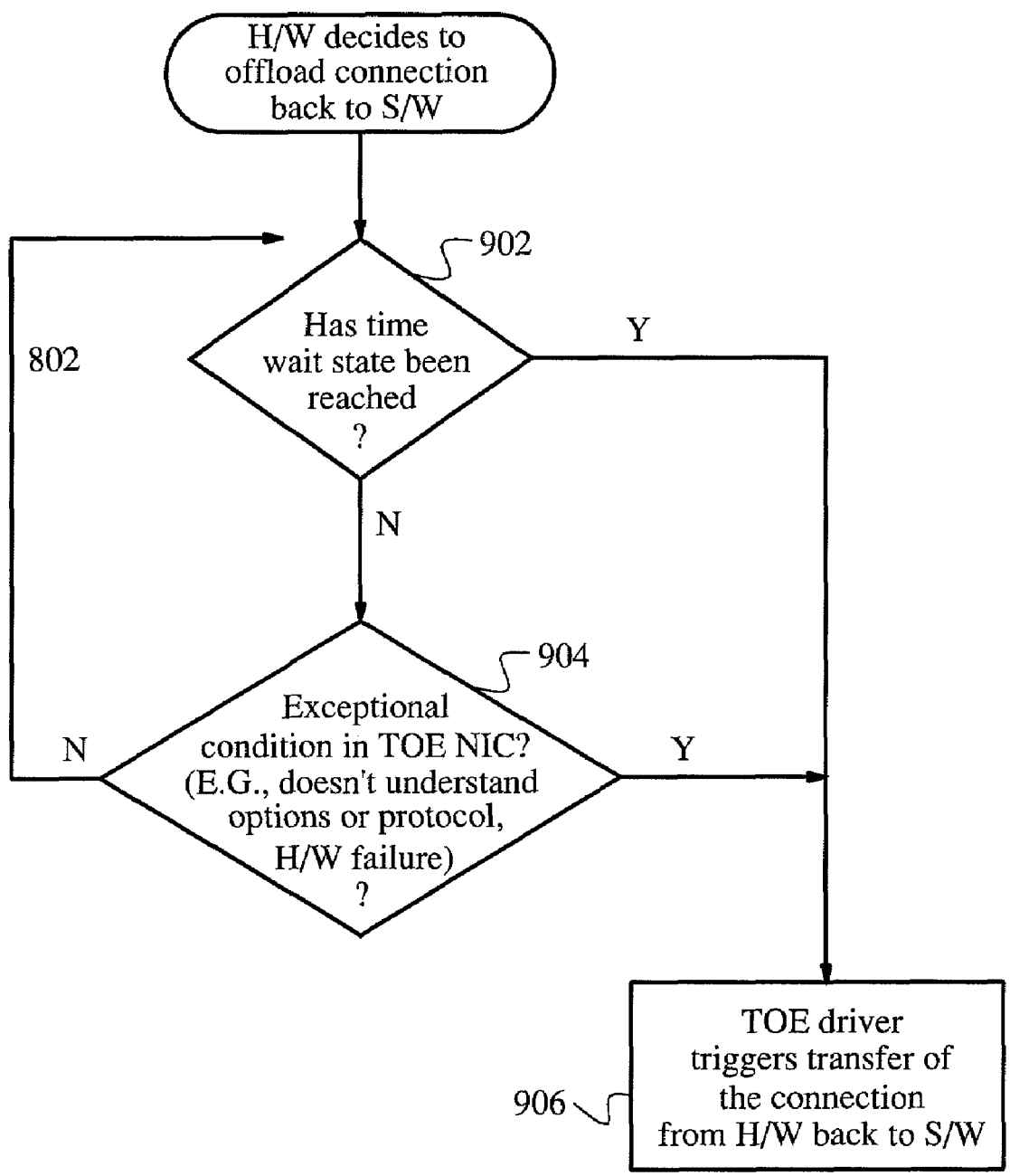
FIG. 9 is a process flow diagram illustrating a method of determining when to offload the network connection back to the software from the hardware as shown at block 416 of FIG. 4 in accordance with one embodiment of the invention.

FIG. 9 is a process flow diagram illustrating a method of determining when (or whether) to offload the network connection back to the software from the hardware as shown at block 416 of FIG. 4 in accordance with one embodiment of the invention. As described above, it may be desirable to offload a previously transferred network connection from the second network protocol stack to the first network protocol stack (e.g., that had initially established the network connection). There are various instances when it is desirable to offload a network connection from hardware back to the software network protocol stack. As described above with reference to FIG. 8, when a time wait state has been reached as shown at block 902, it may be desirable to offload the network connection back to the software network protocol stack. Specifically, in a time wait state, the network connection has been processed and is in a time wait state. In other words, very little resources are necessary to process the network connection. As a result, the hardware is not being used to its full capacity for this particular network connection. Since the number of network connections that the NIC can process are limited, it may be desirable to offload this particular network connection so that another network connection may be handled in its place.

As another example, other exceptional conditions may occur in the hardware (e.g., TOE capable NIC) as shown at block 904. As described above, the hardware may not support a particular protocol or options necessary to sustain the network connection. Alternatively, there may be a hardware failure, making it impossible for the NIC to receive any additional network connections or to continue handling its current network connections.

When a time wait state has been reached 902 or an exceptional condition occurs in the TOE capable NIC 904, an indicator is provided to the software (e.g., computer operating system) indicating a request to transfer the network connection back to the software network protocol stack. The indicator may be provided to the operating system kernel (e.g., TCP/IP stack or socket layer), enabling the operating system kernel to transfer the network connection back to the software network protocol stack. Specifically, the TOE capable NIC (e.g., hardware network protocol stack) or its associated driver may send an appropriate indicator to the computer operating system as shown at block 906 to trigger the transfer of the network connection from the TOE capable NIC to the software.

When the indicator is received by the operating system kernel (e.g., the first network protocol stack), the operating system kernel (e.g., software network protocol stack or socket layer) then effects the transfer of the network connection. Specifically, in accordance with one embodiment, the TCP layer calls the second API described above in order to obtain the connection state information from the TOE capable NIC, as well as any unsent and/or undelivered data. In this manner, the connection state information for the network connection may be obtained from the hardware network protocol stack or its associated driver. The network connection may then be handled by the software network protocol stack using this obtained connection state information. In this manner, the software network protocol stack may process any unsent and/or undelivered data.

TCP is generally a reliable transport protocol. Specifically, each packet that is transmitted is acknowledged by an acknowledgement packet. If such an acknowledgement packet is not received, the packet will continually be retransmitted.

TOE capable NICs suffer from problems associated with a standard NIC. Specifically, there is a risk of failure of a TOE capable NIC. The consequences can be drastic when a TOE capable NIC fails for connections that were offloaded to it. There are several instances in which a failure can result in unreliable transport of data to or from the TOE capable NIC. First, if the TOE capable NIC fails after an acknowledgement is sent by the TOE capable NIC, but before the data has been transferred to the socket layer from the TOE capable NIC, the loss of data will go undetected. Second, if a packet becomes corrupted while being sent from the TOE capable NIC to the socket layer, this corruption will remain undetected. Although the TCP software layer could detect data corruption, in the described embodiments, the TOE capable NIC operates independently from the software stack once a connection has been transferred to the TOE capable NIC. Thus, corrupted data would go undetected. Similarly, the TOE capable NIC can fail after the socket layer has sent data to be transmitted for a network connection that has been offloaded to the TOE capable NIC, which could not be sent by the failed TOE capable NIC.

Figure 10:
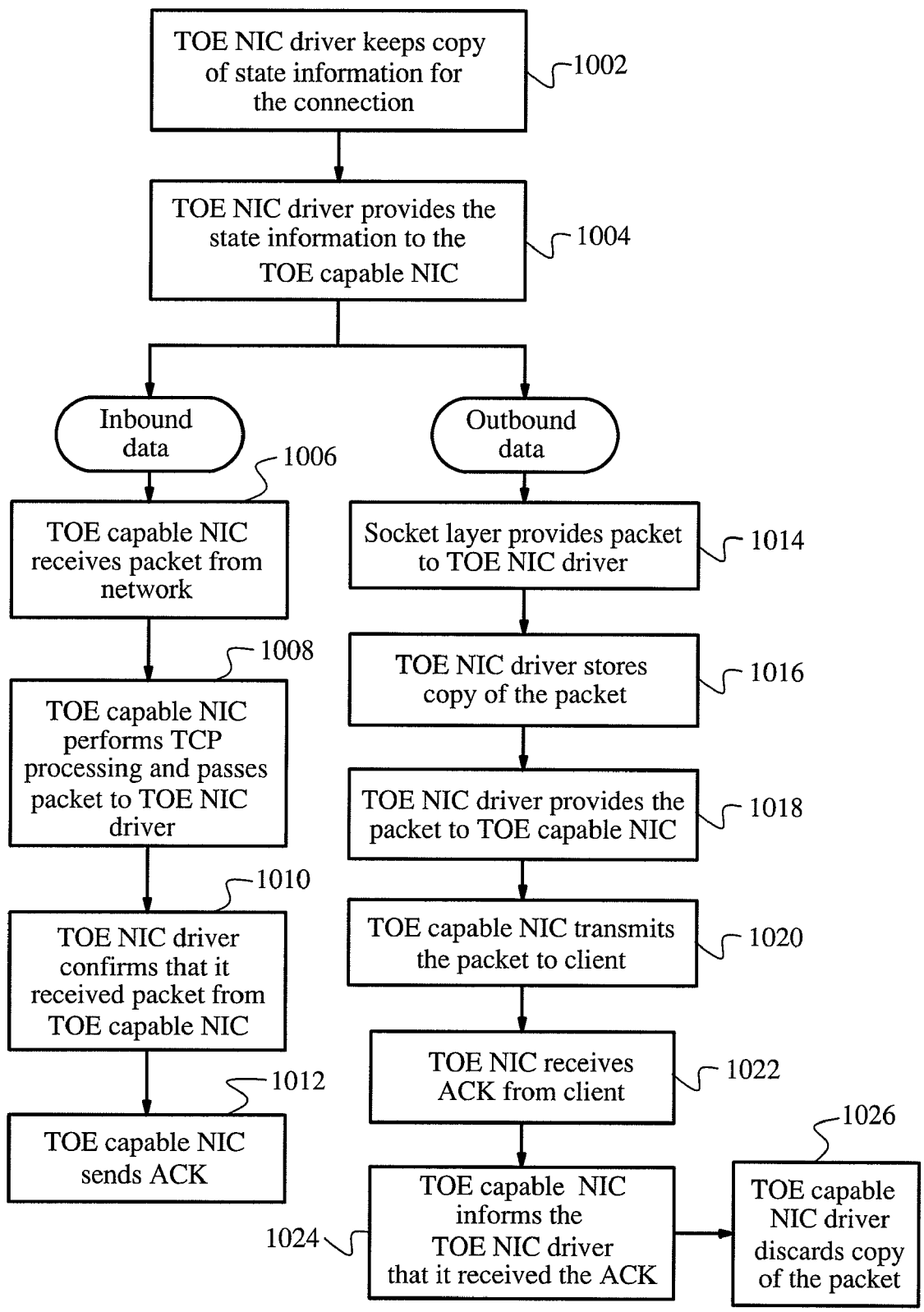
FIG. 10 is a process flow diagram illustrating a method of processing inbound and outbound packets at block 702 of FIG. 7 to prevent loss of data in the event of a failure of the TOE capable NIC in accordance with one embodiment of the invention.

FIG. 10 is a process flow diagram illustrating a method of processing inbound and outbound packets at block 702 of FIG. 7 to prevent loss of data in the event of a failure of the TOE capable NIC in accordance with one embodiment of the invention. As described above, state information for two different network protocol stacks is transmitted or "shared." State information may include, for example, information maintained in the socket connection state and/or kernel TCP/IP connection state as described above with reference to FIG. 3. This state information may include, for example, an identifier for the network connection, the IP addresses and ports for a client and server of the connection, and send/receive sequence numbers for one or more packets transmitted during the connection. This sharing of information can be accomplished by communicating the state information directly, or indirectly via a driver associated with the hardware network protocol stack. Specifically, as described above, the two different APIs may be used to effect the sharing of this state information via the driver.

In order to prevent the loss of information (and data), in accordance with one embodiment, the driver maintains a copy of this state information that is provided to the TOE capable NIC. Specifically, when a network connection is transferred to the TOE capable NIC from the software network protocol stack, state information associated with the network connection is provided to the driver As shown in FIG. 10, the TOE capable NIC driver maintains a copy of the state information associated with the network connection as shown at block 1002, thereby enabling the software network protocol stack to obtain the state information from the driver in the event of a failure of the NIC. In addition, the driver provides the state information to the TOE capable NIC as shown at block 1004, thereby enabling the hardware network protocol stack to process the network connection. The driver maintains a copy of the state information throughout the network connection, and may discard the copy of the state information when the network connection is discontinued.

In accordance with one embodiment, in order to prevent the loss of data packets, each data packet that is processed by the NIC is also received by the driver, thereby enabling the software network protocol stack to obtain the state information and the data packet(s) from the driver in the event of a failure of the NIC. Specifically, the driver maintains a copy of each data packet until it receives or is notified of an acknowledgement that the packet has been received by its intended destination. The data packet may then be discarded by the driver.

For inbound data packets, the TOE capable NIC receives a data packet from the network at block 1006. The TOE capable NIC performs TCP processing and passes the data packet to the driver at block 1008. The driver sends a confirmation to the TOE capable NIC to confirm receipt of the data packet from the TOE capable NIC at block 1010, and the TOE capable NIC sends an acknowledgement packet to the driver at block 1012, thereby acknowledging receipt of the data packet. In the case of a synchronous transfer of data from the TOE capable NIC to the NIC driver, explicit confirmation by the TOE capable NIC is not required, and the TOE capable NIC can acknowledge the data packet as soon as the synchronous transfer completes. Specifically, the TOE capable NIC can itself determine whether the transfer was successful without requiring the operating system or the NIC driver to send a message to the TOE capable NIC indicating failure or success. It should be noted that the NIC driver can maintain the data internally and push the data to the socket layer at a later time (e.g., in bigger portions) or when required.

For outbound data packets, the socket layer provides a data packet to the TOE capable NIC driver at block 1014. The driver stores a copy of the data packet at block 1016, and provides the data packet to the TOE capable NIC at block 1018. The TOE capable NIC then transmits the packet to the client at block 1020. The TOE capable NIC then receives an acknowledgement packet from the client acknowledging receipt of the data packet at block 1022. The TOE capable NIC then sends a confirmation to the driver informing the driver that the acknowledgement packet has been received from the client as shown at block 1024, thereby enabling the driver to discard the copy of the data packet at block 1026.

Upon receiving an indication that the NIC has failed, the software may obtain any unsent and/or undelivered data packets from the driver, as described above. Specifically, the operating system (e.g., software network protocol stack) upon receiving the indication, may obtain the unsent and undelivered data packets (and state information). Alternatively, it is contemplated that the unsent and/or undelivered packets may be obtained from the hardware network protocol stack. In this manner, any unsent and undelivered data may be obtained by the software network protocol stack, thereby enabling the software network protocol stack to resume the network connection and process the unsent and/or undelivered data packets using the obtained state information. In this manner, the reliability of the offloaded network connection is ensured.

Figure 11:
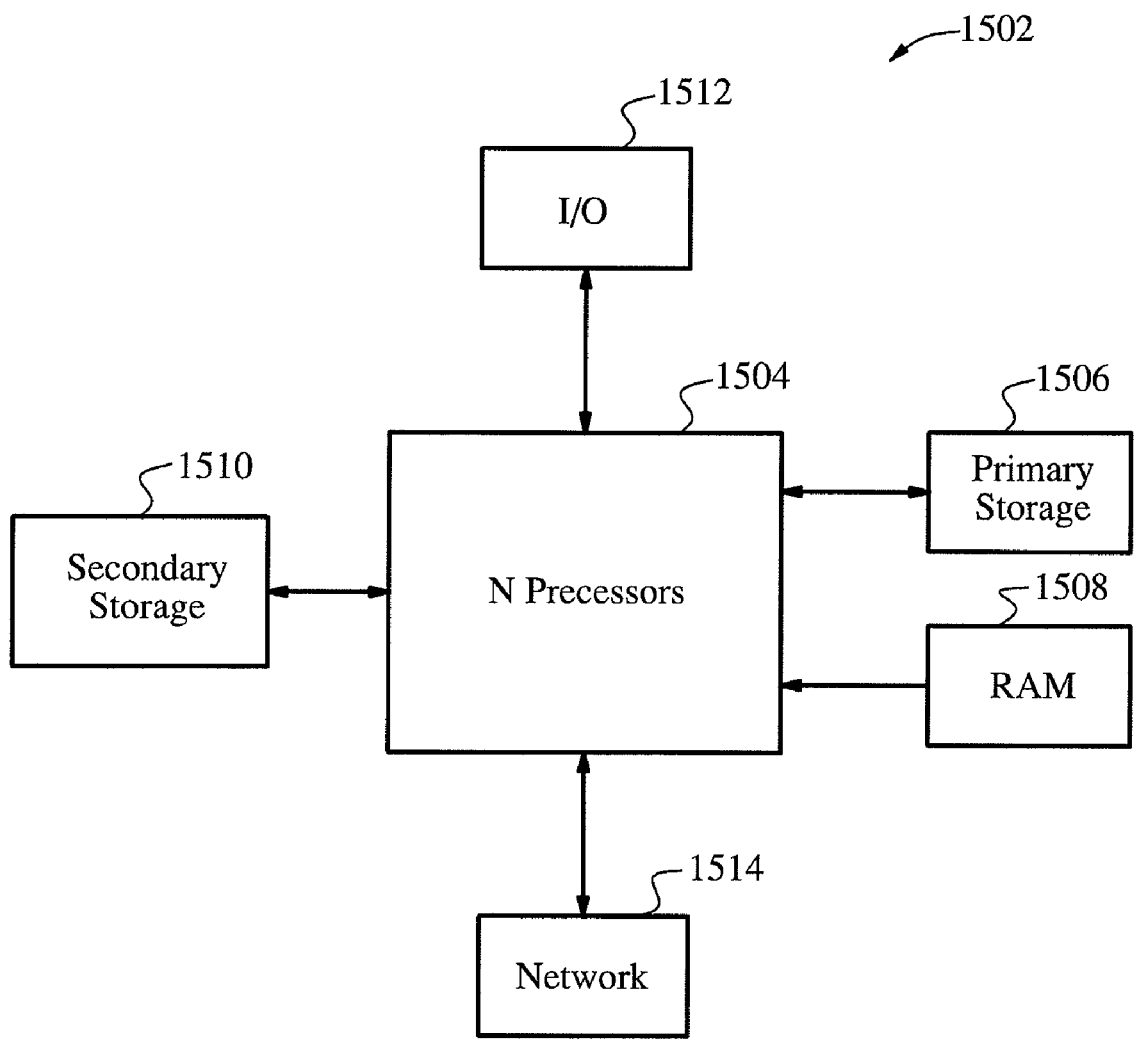
FIG. 11 is a block diagram illustrating a typical, general-purpose computer system suitable for implementing the present invention.

The present invention may be implemented on any suitable computer system. FIG. 11 illustrates a typical, general-purpose computer system 1502 suitable for implementing the present invention. The computer system may take any suitable form.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bi-directional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the above-described embodiments are set forth in relation to two TCP/IP network protocol stacks, these embodiments are merely illustrative. Accordingly, the described embodiments may be implemented with respect to a variety of network protocols (e.g., UDP, SCTP, DCCP) and corresponding network protocol stacks and may therefore be compatible with a variety of network operating systems. Moreover, the above described process blocks are illustrative only. Therefore, the communication between the two different network protocol stacks may be performed using alternate process blocks as well as alternate data structures. Accordingly, the present embodiments are to be considered as illustrative and not restrictive, and the invention is not to be limited to the details given herein, but may be modified within the scope and equivalents of the appended claims.

What is claimed is:

1. A method of processing a network connection in a computer system, comprising:
    establishing the network connection by a software network protocol stack implemented in a kernel of an operating system associated with the computer system, wherein the kernel maintains kernel-level connection state information for the network connection, and wherein a socket layer maintains socket layer-level connection state information for the network connection;
    determining whether to offload the network connection from the software network protocol stack to a hardware network protocol stack implemented in a TCP Offload Engine (TOE)-capable network interface card operatively connected to the computer system;
    transferring the network connection from the software network protocol stack to the hardware network protocol stack using a network interface card driver comprises:
        obtaining, by the network interface card driver for the software network protocol stack, a hardware connection identifier maintained by the network interface card in association with hardware-level connection state information for the network connection, wherein the software network protocol stack is configured to use the hardware connection identifier to obtain hardware-level connection state information for the network connection; and
        obtaining, by the network interface card driver for the hardware network protocol stack, a reference to socket layer-level connection state information and a reference to kernel-level connection state information, wherein the hardware network protocol stack is configured to use the references to create mappings from the hardware connection identifier to both socket layer-level connection state information and kernel-level connection state information, wherein the hardware network protocol stack is further configured to use the mappings to obtain kernel-level connection state information and socket layer-level connection state information for the network connection, when it is determined to offload the network connection from the software network protocol stack to the hardware network protocol stack; and
    determining to accept the transfer of the network connection at the hardware network protocol stack based on a processing capability of the hardware network protocol stack, wherein the network interface card maintains hardware-level connection state information for the network connection, and
    wherein after the hardware network protocol stack accepts transfer of the network connection, the software network protocol stack is configured to continually reference hardware-level connection state information and the hardware network protocol stack is configured to continually reference kernel-level connection state information and socket layer-level connection state information.

2. The method as recited in claim 1, wherein determining whether to offload the network connection is performed by the operating system kernel of the computer system.

3. The method as recited in claim 2, wherein determining whether to offload the network connection is performed by the socket layer of the operating system kernel.

4. The method as recited in claim 1, wherein determining whether to offload the network connection is performed by the software network protocol stack.

5. The method as recited in claim 1, wherein the hardware network protocol stack is capable of determining whether to offload the network connection back to the software network protocol stack.

6. The method as recited in claim 5, further comprising: receiving an indicator from the hardware network protocol stack, the indicator indicating a request to transfer the network connection back to the software network protocol stack.

7. The method as recited in claim 6, further comprising: obtaining the hardware-level connection state information for the network connection from the hardware network protocol stack using the network interface card driver and the hardware connection identifier for the network connection when the indicator is received; and handling the network connection by the software network protocol stack using the obtained hardware-level connection state information.

8. The method as recited in claim 7, further comprising: obtaining at least one of unsent and undelivered data by the software network protocol stack from the hardware network protocol stack, thereby enabling the software network protocol stack to process the unsent or undelivered data.

9. The method as recited in claim 5, further comprising: handling the network connection by the software network protocol stack after the network connection is offloaded back to the software network protocol stack from the hardware network protocol stack.

10. The method as recited in claim 1, further comprising: handling the network connection by the software network protocol stack until it is determined to offload the network connection to the hardware network protocol stack.

11. The method as recited in claim 1, wherein the kernel-level connection state information comprises IP addresses and ports for a client and server of the network connection, and at least one of send and receive sequence numbers of one or more packets for the network connection.

12. The method as recited in claim 11, wherein the kernel-level connection state information further comprises:
a round trip estimate.

13. The method as recited in claim 12, wherein the kernel-level connection state information further comprises:
a congestion window and slow start information.

14. The method as recited in claim 1, wherein upon transferring the network connection from the software network protocol stack to the hardware network protocol stack, the method further comprising: sending one or more inbound packets by the hardware network protocol stack to the socket layer using the network interface card driver and receiving one or more outbound packets by the hardware network protocol stack from the socket layer using the network interface card driver, wherein the network interface card driver maintains a copy of each packet until the packet reaches its intended destination.

15. The method as recited in claim 1, wherein the network interface card driver is configured to maintain a copy of kernel-level connection state information and a copy of socket layer-level connection state information after the hardware network protocol stack accepts transfer of the network connection.

16. An apparatus for processing a network connection in a computer system, comprising:
means for establishing the network connection by a software network protocol stack implemented in a kernel of an operating system associated with the computer system, wherein the kernel maintains kernel-level connection state information for the network connection, and wherein a socket layer maintains socket layer-level connection state information for the network connection;
means for determining whether to offload the network connection from the software network protocol stack to a hardware network protocol stack implemented in a TOE-capable network interface card operatively connected to the computer system; means for transferring the network connection from the software network protocol stack to the hardware network protocol stack using a network interface card driver comprises: means for obtaining, by the network interface card driver for the software network protocol stack, a hardware connection identifier maintained by the network interface card in association with hardware-level connection state information for the network connection, wherein the software network protocol stack is configured to use the hardware connection identifier to obtain hardware-level connection state information for the network connection; and
means for obtaining, by the network interface card driver for the hardware network protocol stack, a reference to socket layer-level connection state information and a reference to kernel-level connection state information, wherein the hardware network protocol stack is configured to use the references to create mappings from the hardware connection identifier to both socket layer-level connection state information and kernel-level connection state information, wherein the hardware network protocol stack is further configured to use the mappings to obtain kernel-level connection state information and socket layer-level connection state information for the network connection, when it is determined to offload the network connection from the software network protocol stack to the hardware network protocol stack, and means for determining to accept the transfer of the network connection at the hardware network protocol stack based on a processing capability of the hardware network protocol stack, wherein the network interface card maintains hardware-level connection state information for the network connection, and wherein after the hardware network protocol stack accepts transfer of the network connection, the software network protocol stack is configured to continually reference hardware-level connection state information and the hardware network protocol stack is configured to continually reference kernel-level connection state information and socket layer-level connection state information.

17. A computer-readable medium storing thereon computer-readable instructions for processing a network connection in a computer system, comprising:
instructions for establishing the network connection by a software network protocol stack implemented in a kernel of an operating system associated with the computer system, wherein the kernel maintains kernel-level connection state information for the network connection, and wherein a socket layer maintains socket layer-level connection state information for the network connection;
instructions for determining whether to offload the network connection from the software network protocol stack to a hardware network protocol stack implemented in a TOE-capable network interface card operatively connected to the computer system;
instructions for transferring the network connection from the software network protocol stack to the hardware network protocol stack using a network interface card driver comprises:
instructions for obtaining, by the network interface card driver for the software network protocol stack, a hardware connection identifier maintained by the network interface card in association with hardware-level connection state information for the network connection wherein the software network protocol stack is configured to use the hardware connection identifier to obtain hardware-level connection state information for the network connection; and
instructions for obtaining, by the network interface card driver for the hardware network protocol stack, a reference to socket layer-level connection state information and a reference to kernel-level connection state information, wherein the hardware network protocol stack is configured to use the references to create mappings from the hardware connection identifier to both socket layer-level connection state information and kernel-level connection state information, wherein the hardware network protocol stack is further configured to use the mappings to obtain kernel-level connection state information and socket layer-level connection state information for the network connection, when it is determined to offload the network connection from the software network protocol stack to the hardware network protocol stack; and instructions for determining to accept the transfer of the network connection at the hardware network protocol stack based on a processing capability of the hardware network protocol stack, wherein the network interface card maintains hardware-level connection state information for the network connection, and wherein after the hardware network protocol stack accepts transfer of the network connection, the software network protocol stack is configured to continually reference hardware-level connection state information and the hardware network protocol stack is configured to continually reference kernel-level connection state information and socket layer-level connection state information.

18. A network device comprising:
an operating system including a software network protocol stack implemented in a kernel of an operating system associated with the computer system, wherein the kernel maintains kernel-level connection state information for a network connection, and wherein a socket layer maintains socket layer-level connection state information for the network connection;
a hardware network protocol stack coupled to the software network protocol stack, wherein the hardware network protocol stack is implemented in a TOE-capable network interface card operatively connected to the computer system,
wherein the operating system being configured for determining whether to offload the network connection to the hardware network protocol stack and transferring the network connection from the software network protocol stack to the hardware network protocol stack using a network interface card driver comprises:
obtaining, by the network interface card driver for the software network protocol stack, a hardware connection identifier maintained by the network interface card in association with hardware-level connection state information for the network connection, wherein the software network protocol stack is configured to use the hardware connection identifier to obtain hardware-level connection state information for the network connection; and
obtaining, by the network interface card driver for the hardware network protocol stack, a reference to socket layer-level connection state information and a reference to kernel-level connection state information, wherein the hardware network protocol stack is configured to use the references to create mappings from the hardware connection identifier to both socket layer-level connection state information and kernel-level connection state information, wherein the hardware network protocol stack is further configured to use the mappings to obtain kernel-level connection state information and socket layer-level connection state information for the network connection, when it
determines that it will offload the network connection to the hardware network protocol stack; and
a control component being configured for determining to accept the transfer of the network connection at the hardware network protocol stack based on a processing capability of the hardware network protocol stack and wherein the network interface card maintains hardware-level connection state information for the network connection, and wherein after the hardware network protocol stack accepts transfer of the network connection, the software network protocol stack is configured to continually reference hardware-level connection state information and the hardware network protocol stack is configured to continually reference kernel-level connection state information and socket layer-level connection state information.

19. The network device as recited in claim 18, wherein the software network protocol stack is a TCP/IP stack and the hardware network protocol stack is a TCP/IP stack.

20. The network device as recited in claim 18, wherein the hardware network protocol stack is capable of determining whether to offload the network connection back to the software network protocol stack.

21. The network device as recited in claim 20, wherein the hardware network protocol stack sends an indicator when it requests to transfer the network connection back to the software network protocol stack.

22. The network device as recited in claim 21, wherein the software network protocol stack is adapted for obtaining hardware-level connection state information for the network connection from the hardware network protocol stack using the network interface card driver and the hardware connection identifier for the network connection when the hardware connection indicator is received, thereby enabling the software network protocol stack to handle the network connection using the obtained hardware-level connection state information.

23. The network device as recited in claim 22, wherein the software network protocol stack is further adapted for obtaining at least one of unsent and undelivered data from the hardware network protocol stack, thereby enabling the software network protocol stack to process the unsent or undelivered data.

24. The network device as recited in claim 20, wherein the software network protocol stack is capable of handling the network connection when the network connection is offloaded back to the software network protocol stack from the hardware network protocol stack.

25. The network device as recited in claim 18, wherein the software network protocol stack handles the network connection until it is determined by the operating system to offload the network connection to the hardware network protocol stack.

26. The network device as recited in claim 18, wherein the kernel-level connection state information comprises IP addresses and ports for a client and server of the connection, and at least one of send and receive sequence numbers of one or more packets for the connection.

27. The network device as recited in claim 26, wherein the kernel-level connection state information further comprises: a round trip estimate.

28. The network device as recited in claim 27, wherein the kernel-level connection state information further comprises: a congestion window and slow start information.

29. The network device as recited in claim 18, wherein upon transferring the network connection from the software network protocol stack to the hardware network protocol stack, the hardware network protocol stack is in communication with a socket layer of the software network protocol stack, thereby enabling data to be sent by the hardware network protocol stack to the socket layer and enabling data to be received by the hardware network protocol stack from the socket layer.

30. The network device as recited in claim 18, wherein the network interface card driver is configured to maintain a copy of kernel-level connection state information and a copy of socket layer-level connection state information after the hardware network protocol stack accepts transfer of the network connection.

* * * * *